Figure 4A:
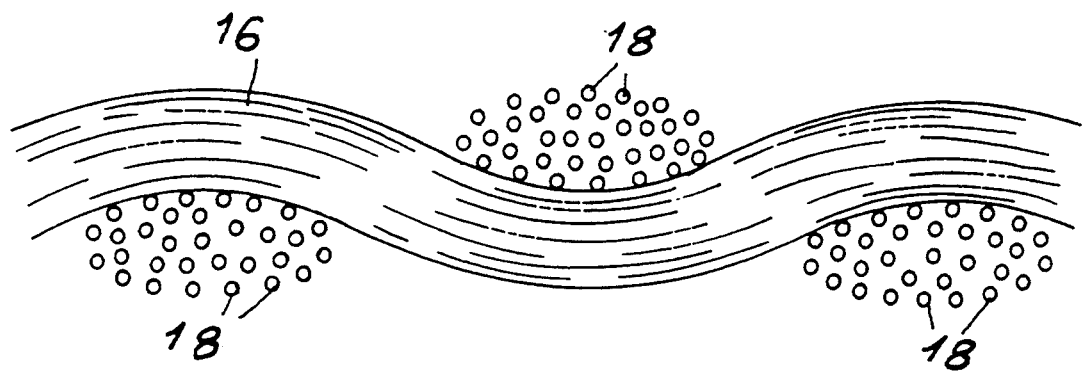

United States Patent [19]

Coffy

[11] Patent Number: 5,360,503
[45] Date of Patent: Nov. 1, 1994

[54] SEMI-FINISHED PRODUCT AND THERMOPLASTIC COMPOSITE MATERIAL HAVING LIQUID CRYSTAL POLYMERS AND PROCESS FOR THE PRODUCTION OF THE MATERIAL

[75] Inventor: René L. Coffy, Rue des Lavrier, France

[73] Assignee: Aerospatiale, France

[21] Appl. No.: 75,479

[22] PCT Filed: Dec. 18, 1991

[86] PCT No.: PCT/FR91/01031

§ 371 Date: Jun. 17, 1993

§ 102(e) Date: Jun. 17, 1993

[87] PCT Pub. No.: WO92/11311

PCT Pub. Date: Jul. 9, 1992

[30] Foreign Application Priority Data

Dec. 19, 1990 [FR]  France ............... 90 15930

[51] Int. Cl.⁵ .............. B29C 51/00; B32B 31/20; C09K 19/38; D02G 3/04
[52] U.S. Cl. ......................... 156/175; 57/243; 57/250; 57/258; 57/905; 139/420 A; 156/181; 156/224; 264/258; 264/324; 428/36.1; 428/36.3; 428/36.91; 428/36.92; 428/110; 428/113; 428/114; 428/229; 428/240; 428/259; 428/373; 428/394
[58] Field of Search ............. 428/110, 113, 114, 229, 428/240, 259, 373, 394, 542.8, 913, 253; 156/175, 181, 224; 264/258, 324; 139/420 A; 57/243, 250, 258, 905

[56] References Cited

U.S. PATENT DOCUMENTS

| | | | |
|---|---|---|---|
| 4,362,777 | 12/1982 | Miller | 428/224 |
| 4,384,016 | 5/1983 | Ide et al. | 428/910 |
| 4,614,678 | 9/1986 | Ganga | 428/74 |
| 4,713,139 | 12/1987 | Ganga | 156/500 |
| 4,925,729 | 5/1990 | O'Connor | 428/245 |
| 4,939,026 | 9/1990 | Luise | 428/224 |
| 5,124,184 | 6/1992 | Wong | 428/910 |
| 5,160,485 | 11/1992 | Jaillet et al. | 428/246 |
| 5,227,236 | 7/1993 | Handermann | 428/361 |

FOREIGN PATENT DOCUMENTS

| | | |
|---|---|---|
| 0133825 | 3/1985 | European Pat. Off. . |
| 0182335 | 5/1986 | European Pat. Off. . |
| 0217563 | 4/1987 | European Pat. Off. . |
| 0303173 | 2/1989 | European Pat. Off. . |
| 0340655 | 11/1989 | European Pat. Off. . |
| 0392939 | 10/1990 | European Pat. Off. . |
| 2105247 | 3/1983 | United Kingdom . |

OTHER PUBLICATIONS

Database WPIL, accession No. 89-202189 [28], Derwent Publications Ltd. (Londres, GB), & JP-A-1 139 842 (Toyobo K.K.) 1 Jun. 1989.

Specialty Reinforcing Fibers, Allen J. Klein, May/Jun. 1988 Advanced Composites.

*Primary Examiner*—James C. Cannon
*Attorney, Agent, or Firm*—Pearne, Gordon, McCoy & Granger

[57] ABSTRACT

The semi-finished product according to the invention consists exclusively of liquid crystal thermoplastic polymers (LCP), whereof at least one first liquid crystal thermoplastic polymer (LCP) is in the form of fibers (18) and has a given melting point, and whereof at least one second liquid crystal thermoplastic polymer (LCP) (16) has a melting point below that of the first LCP. This semi-finished product is in particular a fabric. By simply heating under pressure at a temperature equal to the melting point of the second LCP, followed by cooling, a composite material with improved mechanical and physicochemical performance characteristics are obtained.

12 Claims, 2 Drawing Sheets

FIG. 1a
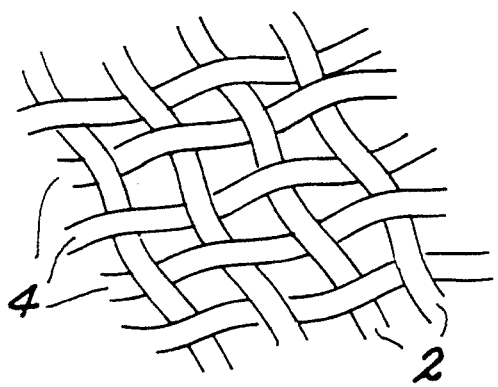
FIG. 1b
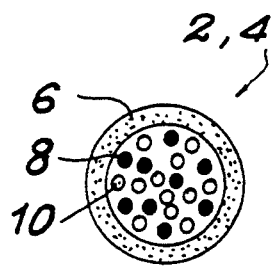
FIG. 2a
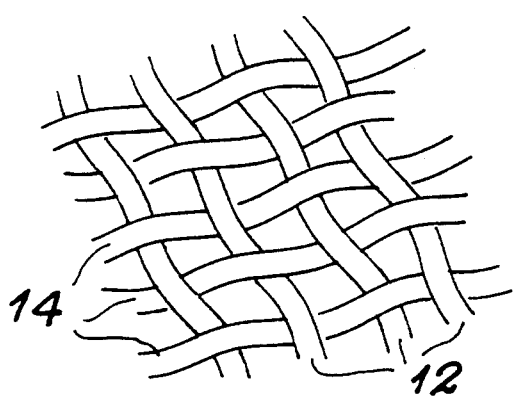
FIG. 2b
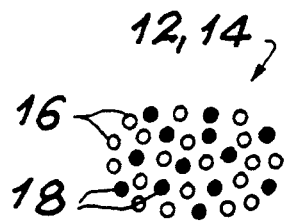
FIG. 3a
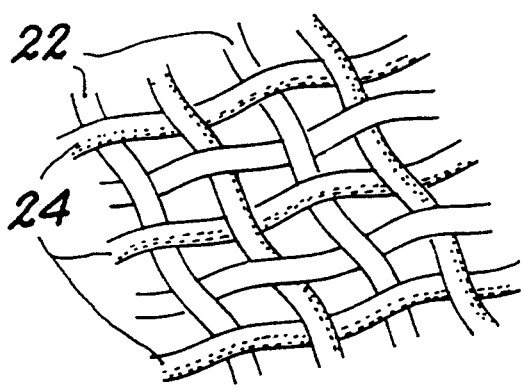
FIG. 3b
FIG. 3c

SEMI-FINISHED PRODUCT AND THERMOPLASTIC COMPOSITE MATERIAL HAVING LIQUID CRYSTAL POLYMERS AND PROCESS FOR THE PRODUCTION OF THE MATERIAL

The present invention relates to a reinforced thermoplastic composite product to be used in the manufacture of entirely thermoplastic, reinforced composite materials having high mechanical and physicochemical performance characteristics. The composite materials to which the invention applies are fibrous reinforcement materials.

Known composite materials are constituted by mineral or organic reinforcing fibres ensuring the strength and rigidity of the parts and an organic or inorganic matrix ensuring the connection between the reinforcing fibres, as well as the transfer of forces between said fibres. The fibres are generally of glass, silica, carbon, silicon carbide, alumina and aramide. The matrix is generally of metal, glass, ceramic or thermosetting resin.

These composite materials can be used in numerous industrial fields and in particular in the space, aeronautical, avionics, car, nautical and competition sports fields, as well as in general terms for producing light-weight mechanical parts having high mechanical strength characteristics.

The combination of fibres and matrixes of different physicochemical natures leads to interface problems between the fibres and the matrix such as wettability, adhesion, oxidation, the creation of another substance (e.g. an oxide in the case of non-oxide ceramic fibres), etc. These phenomena are generally dealt with by adding at least one third organic or inorganic product deposited on the fibres and/or in the matrix. When this third product is deposited on the fibres, it is known as a sizing agent.

The use of this third material somewhat complicates the manufacture of composite materials, thus increasing their manufacturing time and also their costs.

In order to reduce production costs, improved mechanical and physicochemical performance characteristics and the resistance to damaging of composite materials with a fibrous reinforcement, it is known to use a thermoplastic matrix in place of thermosetting matrix or an inorganic matrix. However, the thermoplastics used at present for the matrix have high use temperatures (exceeding 400° C.) which, apart from a high energy consumption, leads to the use of difficult tools for controlling the pressure in the mould, which is also prejudicial to the production costs and production efficiency of these composites.

Reference is made to EP-A-340 655 as a document relating to entirely thermoplastic products using matrixes with a high use temperature.

EP-A-303 173 describes moulded articles in the form of sheets constituted by aramide fibres or aromatic polyester fibres or films. Unlike aramide, the latter has an anisotropy in the melted state. In addition, aramide is not a thermoplastic polymer (cf. in this connection EP-A-329 939). These polymers of different natures consequently have the aforementioned interface problems.

The present invention relates to a solid, thermoplastic composite semi-finished product to be used in the manufacture of composite materials having reinforcing fibres making it possible to obviate the disadvantages referred to hereinbefore. In particular, it avoids the use of an additional interphase material between the fibres and the matrix of a composite material, while eliminating the interface problems between the latter.

For this purpose, the invention proposes producing a novel, entirely thermoplastic composite material, whose reinforcing fibres and matrix are of the same chemical nature or natures which are very similar to one another.

Moreover, the invention makes it possible to reduce production costs and simplify the production of the composite materials by the use of special thermoplastic polymers for forming the matrix of composite materials. These polymers are liquid crystal polymers known under the abbreviation LCP.

Thermotropic liquid crystal polymers (LCP) are crystalline polymers having four stable states and three phase change temperatures: solid-liquid crystal, liquid crystal-isotropic liquid and isotropic liquid-gas.

The liquid crystal state consists of an arrangement of molecules and an oriented unidirectional crystalline structure, whilst the isotropic liquid state corresponds to an amorphous structure and to a disorientation of the molecules.

In the solid state and the molten state, the LCP molecules are organized in long parallel chains (rigid in the solid state) and thus constitute continuous polymer fibres, which interact with one another in accordance with the theory of liquid crystals. The LCP polymers are self-reinforcing with a high crystalline anisotropy.

For further details on LCP's, reference can be made to EP-A-217 563 and "Specialty reinforcing fibres", Advanced Composite, May/June 1988, pp 32–44 by Allen J. Klein.

More specifically, the invention relates to a thermoplastic composite semi-finished product consisting exclusively of liquid crystal thermoplastic polymers, whereof at least one first liquid crystal thermoplastic polymer is in the form of fibres and has a given melting point and whereof at least one second liquid crystal thermoplastic polymer has a melting point below that of the first LCP.

The term fibres is used to cover any long or short filament or thread.

The thermoplastic composite semi-finished product according to the invention is solid and is used in the same way as a thermosetting resin preimpregnate in the wet state. It can be in the form of wicks, slivers or strands, or in the form of continuous threads for producing a composite material part by filamentary winding, or can be in the form of a fabric, or layers of stacked fibres, oriented in one or more directions for producing composite materials by draping.

This thermoplastic composite semi-finished product is consequently intended to be used in the production of thermoplastic composites having reinforcing fibres embedded in a matrix.

Thus, the invention also relates to a thermoplastic composite material exclusively produced from liquid crystal polymers (LCP), in which the reinforcing fibres are constituted by at least one first liquid crystal thermoplastic polymer having a given melting point and in which the matrix is constituted by at least one second liquid crystal thermoplastic polymer having a melting point which is lower than that of the first LCP.

According to the invention, this composite material is obtained by using the previously described semi-finished product by subjecting it under pressure to a temperature at least equal to the melting point of the second.

LCP, but which is below the melting point of the first LCP and allowing the material obtained to cool.

Within the scope of the invention, the crystalline solid phase with oriented chains of the polymers must be observable in the use temperature range of the composite materials and in particular a range extending from 0° to 250 °C.

Thus, the use of the liquid crystal polymers according to the invention is only suitable if the unidirectional structure is retained in the solid finished product, so as to retain the high mechanical characteristics given to it by the latter.

The liquid crystal polymers (LCP) have a large number of advantages and in particular a good resistance to flames and high temperatures, due to their rigid state limiting the movements of the molecules in all directions. Thus, the molecules do not absorb the thermal energy.

In addition, the liquid crystal polymers can be exposed to a large number of organic or aqueous solvents and to a large number of corrosive materials without decomposing. This is due to the presence of a large number of configurations of perfectly chemically stable atoms.

Moreover, the liquid crystal polymers can be exposed to radiation (UV, visible, microwave) without decomposing and have a higher dielectric strength than flexible chain polymers.

They also have a low density (approximately 1.4 g/cm$^3$) and a high rupture strength due to their structure incorporating reinforcing fibres and are two to five times more rigid than steel, aluminium or glass. The liquid crystal polymers have roughly the same rigidity as carbon fibres.

Liquid crystal polymers also have the advantage of a relatively low melting point, below 400° C. and generally between 280° and 400° C.

The liquid crystal polymers (LCP) usable in the invention are in particular polyesters obtained by the polycondensation of aromatic and/or cycloaliphatic dicarboxylic acids with aromatic and/or cycloaliphatic diols, optionally mixed with aromatic hydroxy acids having polymerizable functional groups. Examples of polymers usable in the invention are given in EP-A-340 655.

Advantageously, the composite semi-finished product is exposed to a temperature equal to the melting point of the second LCP in order to form the composite material.

Thus, the melting phase under pressure of the second LCP constituting the matrix is quasi-instantaneous as from the incident when said melting point is reached and the temperature rise is as fast as is desired. The time necessary for this temperature rise is e.g. well below that necessary for the hot polymerization of synthetic resins of the thermosetting epoxy resin type. This time gain is very interesting for reducing production costs, because in the same tool the parts to be manufactured can follow one another at a faster rate. In particular, the time gain is 50 to 600%.

For ease of performance, the temperature difference between the melting points of the first and second liquid crystal polymers is at least equal to 10° C. and preferably exceeds 20° C.

The oriented unidirectional crystalline structure of the liquid crystal thermoplastic polymers gives them mechanical characteristics superior to other thermoplastics, as well as improved physicochemical properties. In addition, the LCP's can be easily moulded.

In particular, the composite materials according to the invention can be formed by moulding in a press using a mould with heat action and pressure action, by moulding in the autoclave or by stamping, after softening the matrix in the manner of sheet metals.

Advantageously, the fibres of the first LCP and the second LCP are arranged so as to form a fabric. This entirely thermoplastic fabric has a high deformability flexibility making it possible to drape relatively complex forms unlike in the case of a large number of thermoplastic fabrics having non-liquid crystal matrixes according to the prior art. This fabric can be produced in a conventional manner and use conventional textile industry fabric production processes.

The second LCP can advantageously be in fibre form. This technology is of particular interest to weavers, because it makes it possible to produce in a single weaving stage a semi-finished product from thermoplastic reinforcing fibres and thermoplastic matrix fibres.

The fabrics obtained are highly flexible and deformable. In particular, it is possible to produce a knitted product, which is a particularly deformable fabric very suitable for the production of parts by stamping.

It is also possible to use the second LCP in the form of a powder regularly distributed around one or more fibres of the first LCP and to sheath the assembly with a sheath of a third liquid crystal thermoplastic polymer ensuring the cohesion of the fibres of the first LCP and the powder of the second LCP.

The small grain size powder (below 30 micrometers) is electrostatically introduced between the first LCP polymer fibres in aqueous dispersion or in a fluidized bath and then sheathing takes place by the third LCP, which can be of the same nature as that constituting the powder or can be of a different nature, provided that it is compatible with the powder. Moreover, this third LCP must have a melting point below that of the first LCP and advantageously very close to or equal to that of the second LCP. For practical reasons, it is possible to use the same LCP for forming the powder and the sheath.

With a view to facilitating weaving, when use is made of fibres of first and second LCP's, the latter are grouped in the form of wicks and the latter are woven. The wicks can be constituted by a single LCP (first or second polymer) or can be constituted by a mixture of the first and second LCP's.

Although the invention is more particularly applicable to the production of fabrics, a laminate being a special fabric, it can also be applied to a wound thread. In this case, the second LCP can be in the form of a sheath surrounding one or more first LCP fibres, or, as described hereinbefore, can be in the form of a powder surrounding one or more sheathed fibres.

The relative quantities of the first LCP and the second (or third) LCP of the composite semi-finished product or the composite material obtained, is in particular dependent on the envisaged use of the material. The proportion of the first and second (or third) LCP's can be adapted in precise manner and the quantity of the second (or third) LCP per surface unit is subject to no limits. Thus, it is possible to use a semi-finished product, whereof the first LCP represents 1 to 99 vol. % and the second LCP, to which may be added the third LCP, represents 1 to 99 vol. %.

However, for reasons of good mechanical characteristics, particularly in tension, use is preferably made of a first LCP representing 30 to 80 vol. % and a second LCP (+ third LCP) representing 20 to 70 vol. % of the semi-finished product or the composite material.

The invention is described in greater detail hereinafter relative to nonlimitative embodiments and with reference to the attached drawings, wherein show:

FIGS. 1 to 3 Diagrammatically three thermoplastic semi-finished products according to the invention.

Figure 4B:
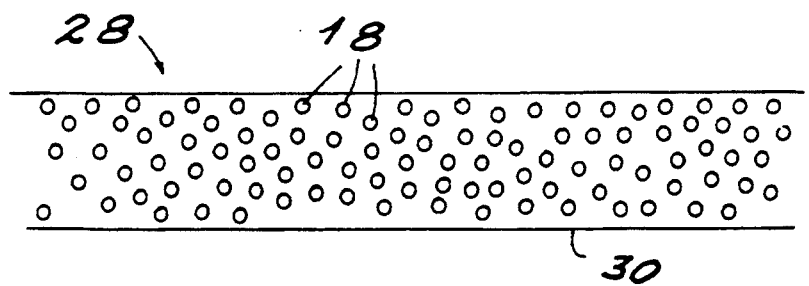

FIG. 4 Diagrammatically the production of a composite material according to the invention.

The following description relates to the production of fabrics due to the particular interest in such semi-finished products, but obviously, as shown hereinbefore, the invention has much wider applications.

According to a first embodiment of the invention shown in FIG. 1, the thermoplastic semi-finished product according to the invention has (part a) wicks or strands 2, 4 of fibres woven in known manner, the wicks 2 e.g. constituting the weft of the fabric and the wicks 4 the warp.

As shown in part b, these wicks 2 and 4 are formed by a sheath 6 of a low melting point, thermotropic liquid crystal polymer (LCP) for forming the matrix of the composite material surrounding the fibres 8 of a higher melting point, thermotropic liquid crystal polymer (LCP) for forming the reinforcing structure of the composite material. A powder 10 is regularly distributed around the fibres 8. This powder 10 is also constituted by a low melting point, thermotropic liquid crystal polymer (LCP) for forming the matrix of the thermoplastic composite material and has a grain size below 30 micrometers.

According to the invention, the LCP of the sheath 6 and that of the powder 10 have a melting point at least 10° C. below that of the LCP forming the fibres 8. Advantageously the same LCP is used for forming the sheath 6 and the powder 10.

Thus, the wicks 2 and 4 are thermoplastic-impregnated fibres. The quantity of reinforcing fibres 8 represents 30 to 80 vol. % of the semi-finished product and the powder and sheath quantity constitutes the rest.

The number of fibres 8 per wick is between 50 and 40,000 and their diameter is between approximately 5 and 20 micrometers. As a function of the number of fibres 8, the wicks 2 and 4 can have a diameter of 0.15 to 2.8 mm and the sheath 6 a thickness of 5 to 350 micrometers.

The thermoplastic composite fabric shown in FIG. 2 has wicks or strands 12 of thermoplastic fibres and wicks or strands 14 of thermoplastic fibres woven in known manner (part a), the wicks 12 constituting the weft threads and the wicks 14 the warp threads.

Each of the wicks 12 and 14 (part b) are constituted by fibres 16 of a low melting point, thermotropic LCP for forming the composite fibre matrix and fibres 18 of a higher melting point, thermotropic LCP for constituting the material reinforcements.

According to the invention, the melting point of the fibres 16 is at least 10° C. below that of the fibres 18. The relative quantity of the fibres 16 and 18 per wick can be precisely adapted and is dependent on the envisaged use of the fabric obtained.

As shown in FIG. 3, it is also possible to use woven wicks 22, 24 (part a) having a different constitution, unlike in the embodiments shown in FIGS. 1 and 2, in which the wicks were all identical.

In particular, the wicks 22 (part b) can be solely constituted by the thermotropic liquid crystal polymer fibres 16 for forming the matrix of the composite material and the wicks 24 can be constituted solely by thermotropic liquid crystal polymer fibres 18 for constituting the reinforcement of the composite material. The fibres 16, respectively 18, can be arranged in parallel or woven.

In part a of FIG. 3, the wicks 22 are woven in order to form the weft threads and warp threads alternating with the wicks 24 used also for forming the warp threads and the weft threads.

It is also possible to use the wicks 22 for solely forming the warp and the wicks 24 for solely forming the weft of the fabric (FIG. 4).

In the embodiment shown in FIGS. 2 and 3, the number of fibres per wick varies from 50 to 40,000 and the unitary fibres have a diameter of 5 to 40 micrometers, as a function of the relative desired quantities of reinforcing polymer and matrix LCP.

On the basis of the semi-finished products shown in FIGS. 1 to 3, it is possible to form a thermoplastic composite material having a fibrous reinforcement, by simply heating under a press the said product at a temperature equal to the melting point of the LCP for forming the matrix.

FIG. 4 illustrates the transformation of a fabric (part a) constituted by fibre wicks 16 for producing the matrix of the composite material and fibre wicks 18 for constituting the reinforcement of the composite material. The fibre wicks 18 and fibre wicks 16 are woven, the fibres 18 constituting the weft threads and the fibres 16 the warp threads of the fabric.

On heating under pressure the fabric shown in part a of FIG. 4 to a temperature equal to the melting point of the fibres 16 and then allowing to cool to ambient temperate, the composite material 28 is obtained, which is constituted by LCP fibres 18 embedded in a LCP matrix 30 having the same composition as the fibres 16.

As the liquid crystal thermoplastic polymer usable in the invention, reference can be made to those manufactured by CELANESE marketed under the name VECTRAN(®), those manufactured by ICI under the name SRP VICTREX(®) (Self Reinforcing Polymers), those marketed by MONTEDISCN under the name GRANLAR(®) or those marketed by DUPONT DE NEMOURS under the name HX 3100(®).

Examples of the invention will now be given.

EXAMPLE 1

This example uses VECTRAN "A" fibres of type A 950, whose melting point is 280° C. for the formation of the matrix polymer and VECTRAN "C" fibres of type C 130, whose melting point: is 327° C., for forming the composite material reinforcement. A fabric like that shown in FIG. 2 was produced by combining 30 vol. % of VECTRAN "A" fibres and 70 vol. % of VENTRAN "C" fibres.

A certain number of layers of this fabric were stacked in a mould, then placed in a heating press, whose walls were raised to a regulated temperature of 280° C. (which is the melting point of the VECTRAN "A" to be used for forming the matrix). During the approximately 10 min. temperature time and whilst maintaining the temperature at 280° C. for 5 min., a moderate pressure of approximately 5 bars ($5 \times 10^5$ Pa) was applied to the mould. After cooling from the temperature of 100° C., a flat plate was obtained in which the woven VEC- TRAN "C" fibres are embedded in a transparent, rigid matrix constituted by melted VECTRAN "A".

The composite material obtained has a remarkable transparency to electromagnetic waves, as well as an excellent fire resistant and thermal insulation.

EXAMPLES 2 AND 3

These examples differ from example 1 by the relative quantities of VECTRAN "A" and VECTRAN "C".

In example 2, a first flat plate was produced from unidirectional fibres (VECTRAN "C") representing 60 vol. % of the plate. In parallel, in example 3 a second flat plate was produced in the form of a fabric containing 50 vol. % of bidirectional fibres (VECTRAN "C").

Mechanical testpieces were taken from these flat plates and the results are given in the following table 1. In the latter, Rt represents the tensile strength and Er the modulus of elasticity.

The table also shows the results of mechanical tests performed on a glass/epoxy laminate containing 50 vol. % of bidirectional glass fibres. This table clearly shows that the tensile strength and modulus of elasticity of the materials according to the invention are comparable to those of a glass/epoxy composite.

In addition, the density of the liquid crystal composites according to the invention of 1.4 g/cm$^3$ is significantly reduced compared with that of glass reinforced composites between 1.8 and 2.1 g/cm$^3$ and is comparable to that of composite materials based on aramide fibres.

This weight gain compared with glass/epoxy laminates is very interesting for the application of the composite materials according to the invention to the aeronautical, space and/or avionics fields.

Moreover, the composite materials obtained according to the invention have an excellent shock and impact resistance, an exceptional non-flammability, lead to reduced emissions of fumes, have a good thermal behaviour, an excellent wet ageing behaviour, a resistant to bases, solvents and acids, an excellent radiation resistance, as well as a higher dielectric strength than that of all the known thermoplastic and thermosetting composite materials.

EXAMPLE 4

A fabric combining SRP VICTREX(®) type 2300 fibres and SRP VICTREX(®) type 320 fibres were also produced in accordance with the process of example 1. The SRP type 2300 has a melting point of 290° C. and is used for producing the matrix and the SRP type 320 with the melting point of 340° C. is used for forming the composite material reinforcements. The fabric contains 30 vol. % SRP type 320 and 70 vol. % SRP type 2300.

The mechanical and physicochemical properties of this fabric are comparable to those obtained for the materials of examples 2 and 3.

The composite materials according to the invention constituted exclusively of liquid crystal polymers have mechanical and physicochemical properties far superior to those of composites formed from polymers in the amorphous state due to the unidirectional crystalline structure of these polymers. This is due to the parallel chain organization of the molecules in order to form continuous polymer fibres, whereas in conventional flexible chain polymers, the organization of the molecules is arbitrary and is not arranged in the same direction.

TABLE

| VALUES | 60% UNI-DIRECTIONAL F | 50% BI-DIRECTIONAL F | BIDIRECTIONAL GLASS/EPOXY |
|---|---|---|---|
| Rt (MPa) | 1190 to 1510 | 490 to 630 | 550 |
| Et (GPa) | 45 to 57 | 17 to 27 | 20 |

I claim:

1. Thermoplastic composite semi-finished product consisting exclusively of liquid crystal thermoplastic polymers (LCP), whereof at least one first liquid crystal thermoplastic polymer (LCP) is in the form of fibres and has a given melting point and where of at least one second liquid crystal thermoplastic polymer (LCP) has a melting point below that of the first liquid crystal polymer.

2. Semi-finished product according to claim 1, characterized in that the fibres of the first liquid crystal polymer and the second liquid crystal polymer are arranged so as to form a fabric.

3. Semi-finished product according to claim 1, characterized in that the second liquid crystal polymer is in the form of fibres.

4. Semi-finished product according to claim 1, characterized in that the second liquid crystal polymer is in the form of a sheathing of fibres of the first liquid crystal polymer.

5. Semi-finished product according to claim 1, characterized in that the second liquid crystal polymer is in the form of a powder distributed around the fibres of the first liquid crystal polymer, a sheath of a third liquid crystal polymer overcoating the powder and fibers of the first liquid crystal polymer ensuring the cohesion of the fibres of the first liquid crystal polymer and the powder, said third liquid crystal polymer having a melting point below that of the first liquid crystal polymer.

6. Semi-finished product according to claim 3, characterized in that the fibres of the first liquid crystal polymer and the fibres of the second liquid crystal polymer are grouped in the form of wicks and that said wicks are woven.

7. Semi-finished product according to claim 1, characterized in that the first liquid crystal product represents 30 to 80 vol. % of the semi-finished product and the second liquid crystal polymer represents 20 to 70 vol. % of the semi-finished product.

8. Thermoplastic composite material having reinforcing fibres embedded in a matrix produced exclusively from liquid crystal polymers and in which the reinforcing fibres are constituted by at least one first liquid crystal thermoplastic polymer having a given melting point and in which the matrix is constituted by at least one second liquid crystal thermoplastic polymer having a melting point below that of the first liquid crystal polymer.

9. Material according to claim 8, characterized in that the reinforcing fibres are woven.

10. Material according to claim 8, characterized in that the first liquid crystal polymer represents 30 to 80 vol. % of the material and the second liquid crystal polymer represents 20 to 70 vol. % of the material.

11. Process for the production of a thermoplastic composite material having reinforcing fibres embedded in a matrix, consisting of using the semi-finished product according to claim 1 and subjecting it, under pressure, to a temperature at least equal to the melting point of the second liquid crystal polymer, but below the melting point of the first liquid crystal polymer and allowing the material obtained to cool.

12. Process according to claim 11, characterized in that the semi-finished product is exposed to a temperature equal to the melting point of the second liquid crystal polymer.

* * * * *